(12) United States Patent
Nguyen et al.

(10) Patent No.: US 6,532,126 B1
(45) Date of Patent: *Mar. 11, 2003

(54) HEAD SWITCHING SEQUENCE IN A DISC DRIVE EMPLOYING HEAD BIAS CURRENTS

(75) Inventors: Hieu Van Nguyen, Oklahoma City, OK (US); Clyde Everett Goodner, III, Midwest City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 09/639,211

(22) Filed: Aug. 15, 2000

Related U.S. Application Data

(63) Continuation of application No. 09/040,795, filed on Mar. 18, 1998, now Pat. No. 6,141,165.
(60) Provisional application No. 60/062,506, filed on Oct. 16, 1997.
(51) Int. Cl.[7] ............................. G11B 15/12; G11B 5/03
(52) U.S. Cl. ............................................ 360/63; 360/66
(58) Field of Search ...................................... 360/63, 66

(56) References Cited

U.S. PATENT DOCUMENTS

| 4,799,112 A | 1/1989 | Bremmer et al. |
| 5,262,907 A | 11/1993 | Duffy et al. |
| 5,276,662 A | 1/1994 | Shaver, Jr. et al. |
| 5,550,502 A | 8/1996 | Aranovsky |
| 5,631,999 A | 5/1997 | Dinsmore |
| 5,719,719 A | 2/1998 | Tsuyoshi et al. |
| 5,774,291 A | 6/1998 | Contreras et al. |
| 5,831,782 A | 11/1998 | Kohno et al. |
| 6,141,165 A | * 10/2000 | Nguyen et al. ............... 360/63 |

* cited by examiner

Primary Examiner—Alan T. Faber
(74) Attorney, Agent, or Firm—Fellers, Snider, et al.

(57) ABSTRACT

An apparatus and method are disclosed for minimizing damage to a disc drive during head switching operations. The disc drive comprises a plurality of magnetic recording surfaces to and from which data are transferred using read/write heads, each head utilizing the application of a bias current during operation. To switch from a presently selected head to a target head, the disc drive determines a first value indicative of the magnitude of a bias current for the presently selected head and a target bias current to be applied to the target head. When the second value is greater than the first value, the disc drive switches from the presently selected head to the target head and then applies the target bias current; conversely, when the first value is greater than the second value, the target bias current is applied to the presently selected head and then the disc drive switches from the presently selected head to the target head.

3 Claims, 4 Drawing Sheets

HEAD SWITCHING SEQUENCE IN A DISC DRIVE EMPLOYING HEAD BIAS CURRENTS

RELATED APPLICATIONS

This application is a continuation of U.S. patent application Ser. No. 09/040,795 filed Mar. 18, 1998 now U.S. Pat. No. 6,141,165 entitled HEAD SWITCHING SEQUENCE IN A DISC DRIVE EMPLOYING HEAD BIAS CURRENTS, which claims the benefit of U.S. Provisional Application No. 60/062,506 entitled IMPROVED HEAD SWITCHING SEQUENCE FOR ADAPTIVE BIASED MAGNETORESISTIVE HEAD SYSTEMS, filed Oct. 16, 1997.

FIELD OF THE INVENTION

The present invention relates generally to the field of disc drive data storage devices and more particularly, but without limitation, to the efficient switching among read/write heads of a disc drive to reduce damage to elements of the heads.

BACKGROUND

Hard disc drives are used in modern computer systems and computer networks to enable users to quickly access vast amounts of electronically stored data. A typical disc drive houses five to ten magnetic discs which are axially aligned and mounted to a spindle motor for rotation at a constant, high speed. An array of read/write heads are controllably positioned adjacent magnetic recording surfaces of the discs in order to store and retrieve the data from tracks defined on the disc surfaces. The heads fly adjacent the recording surfaces on air bearings established by air currents set up by the rotation of the discs.

Of particular interest are heads of the so-called "magneto-resistive" variety, which utilize magneto-resistive (MR) elements to sense the selective magnetization of the tracks during disc drive data transfer operations. A typical MR element is formed from an alloy of materials so as to have a baseline electrical resistance which varies in the presence of a magnetic field of a selected orientation. By passing a bias current through the MR element, the selective magnetization of a corresponding track can be determined in relation to variations in voltage detected across the MR element.

It is common in present generation disc drive manufacturing processes to individually select read bias current magnitudes for each of the MR heads of a disc drive in order to optimize disc drive performance. For example, test data are typically written and then read in turn a number of times using a range of different read bias current magnitudes. Those read bias current magnitudes providing optimum performance are then stored in memory utilized by the drive so that, when a particular head is selected during subsequent operation, the disc drive applies the appropriate read bias current to the particular head.

MR heads are known to be delicate and must be handled and operated it with a certain degree of care so as to prevent inadvertent damage which can degrade the reliability of the heads. Although the application of a relatively larger bias current will generally enhance the sensitivity of an MR head during a read operation, by providing a higher signal to noise ratio in a recovered readback signal, it is important to ensure that the maximum power dissipation capability of the head is not exceeded. As will be recognized, because the MR element operates as a (highly sensitive) resistance, the power P dissipated by the MR element will be generally proportional to the resistance R of the MR element multiplied by the square of the bias current I (i.e., $P=I^2R$). Accordingly, there is all upper limit on the magnitude of the bias current that can be applied to any given MR head, and the application of too large a bias current, even momentarily, can stress the MR head and adversely affect its operational reliability over time.

Accordingly, as efforts continue to provide disc drives with ever increasing levels of data storage capabilities and performance, there remains a continual need for improvements in the art whereby the reliability of the drives can be maintained by minimizing inadvertent stresses upon sensitive components of the drives, such as MR heads.

SUMMARY OF THE INVENTION

The present invention is directed to an apparatus and method for minimizing damage to a disc drive during head switching operations.

In accordance with a preferred embodiment, the disc drive comprises a plurality of magnetic recording surfaces to and from which data are transferred using read/write heads, each head utilizing the application of a bias current during operation. Preferably, the heads are characterized as magneto-resistive heads, each having a magneto-resistive read element.

To switch from a presently selected head to a target head, the disc drive determines a first value indicative of the magnitude of a bias current for the presently selected head and a target bias current to be applied to the target head. When the second value is greater than the first value, the disc drive switches from the presently selected head to the target head and then applies the target bias current; conversely, when the first value is greater than the second value, the target bias current is applied to the presently selected head and then the disc drive switches from the presently selected head to the target head.

The disc drive preferably comprises a preamplifier circuit which is operably coupled to the heads and applies the bias currents to the heads in response to a read bias value provided by a head selection control circuit, such as a disc drive control processor. The head selection control circuit further preferably causes the preamplifier circuit to individually select the heads in response to a head select value. The head bias and head select values are preferably expressed as part of a multi-bit digital word and are provided to a register of the preamplifer by way of a serial input path.

These and various other features as well as advantages which characterize the present invention will be apparent from a reading of the following detailed description and a review of the associated drawings.

DETAILED DESCRIPTION

Figure 1:
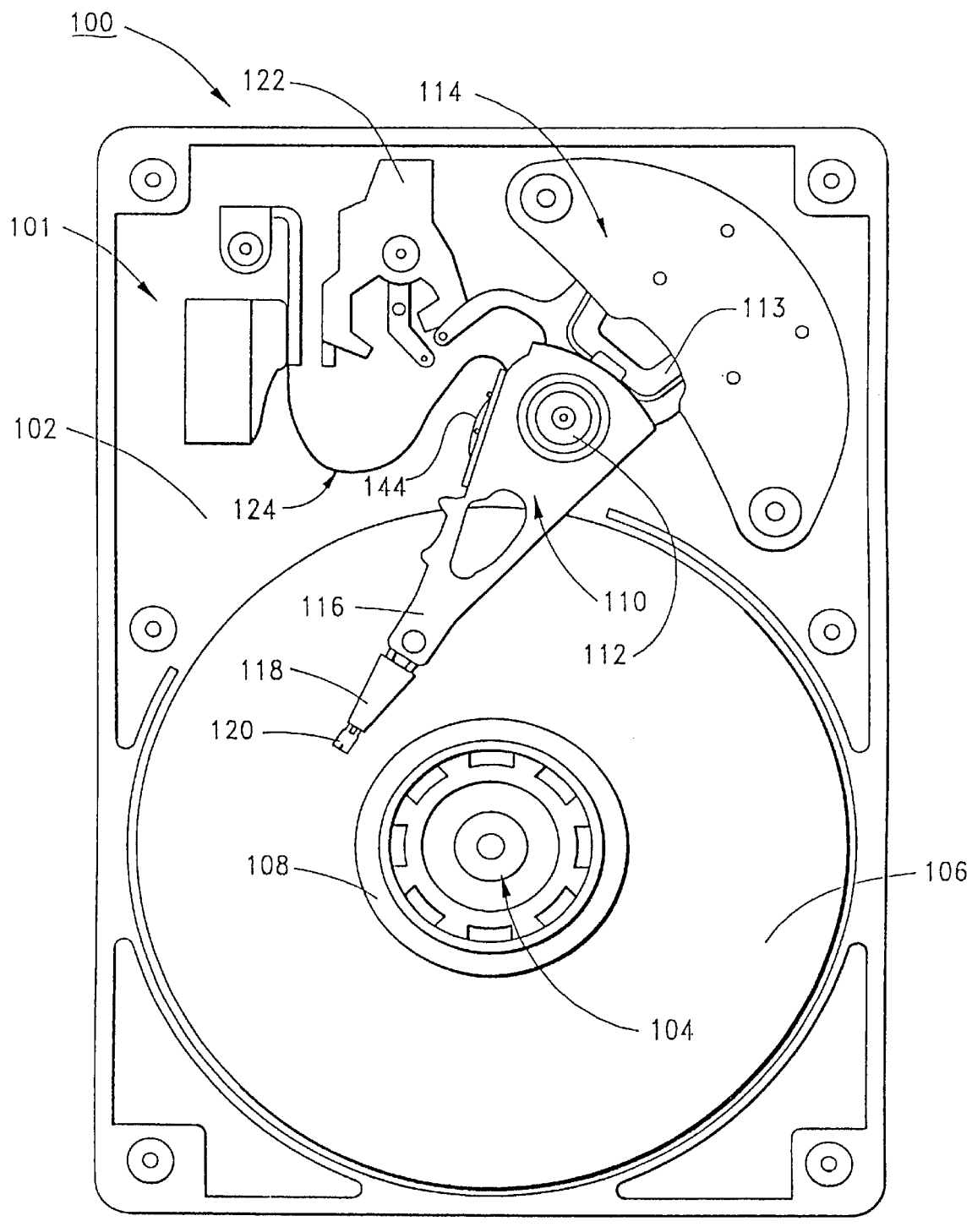
FIG. 1 provides a top plan view of a disc drive constructed in accordance with a preferred embodiment of the present invention.

Referring now to FIG. 1, shown therein is a top plan view of a disc drive 100 constructed in accordance with a preferred embodiment of the present invention.

The disc drive 100 includes a head-disc assembly (HDA) 101 and a disc drive printed wiring assembly (PWA) which is mounted to the underside of the HDA 101 and thus, not visible in FIG. 1. The PWA provides circuitry necessary to control the operation of the HDA 101 and to transfer data between the HDA 101 and a host computer in which the disc drive 100 can be mounted in a user environment.

With reference to FIG. 1, the HDA 101 includes a base deck 102 to which various disc drive components are mounted. A top cover, which has been omitted from FIG. 1 to facilitate the present discussion, cooperates with the base deck 102 to form an internal, sealed environment for the disc drive 100. A spindle motor 104 is provided to rotate a stack of discs (the topmost of which is denoted at 106) at a constant high speed, with a disc clamp 108 securing the discs to the spindle motor 104.

To access the discs, a controllably positionable actuator assembly 110 is provided which rotates about a cartridge bearing assembly 112 in response to currents applied to a coil (a portion of which is shown at 113) of a voice coil motor (VCM) 114. The actuator assembly 110 includes a plurality of arms from which corresponding flexure assemblies extend, the topmost of which are identified at 116 and 118, respectively. Heads are provided at distal ends of the flexure assemblies and are supported over the discs by air bearings established by air currents set up by the rotation of the discs. The topmost head shown in FIG. 1 is denoted at 120.

A latch assembly 122 is provided to secure the heads over landing zones (not designated)at the innermost diameters of the discs when the disc drive 100 is deactivated. A flex circuit assembly 124 provides electrical communication paths between the actuator assembly 110 and the disc drive PWA.

Figure 2:
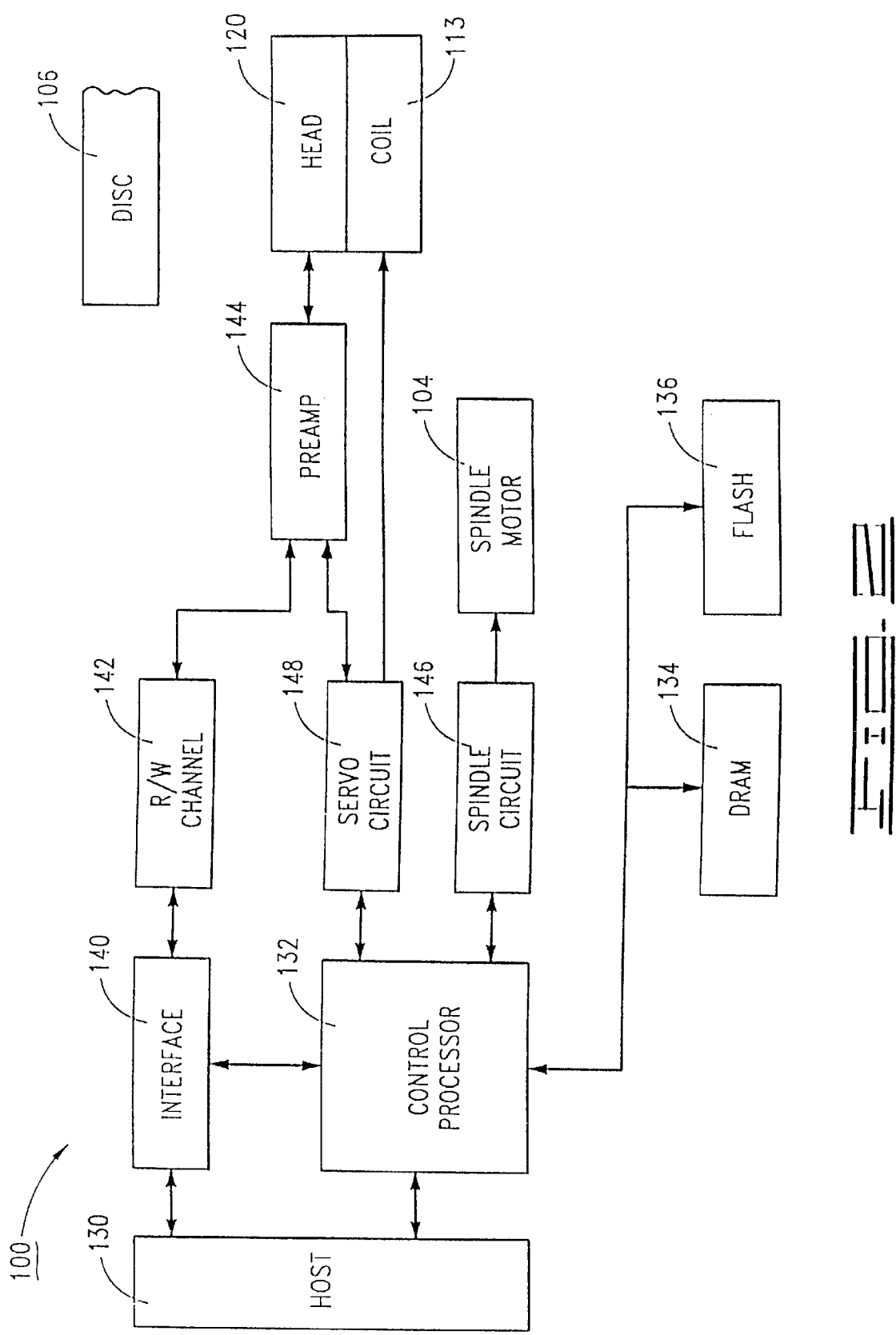
FIG. 2 is a functional block diagram of the disc drive of FIG. 1.

Referring now to FIG. 2, shown therein is a functional block diagram of the disc drive 100 of FIG. 1, in conjunction with a host computer 130 in which the disc drive 100 is contemplated as being mounted. The host computer 130 provides top level control of a disc drive control processor 132, which in turn controls the operation of the disc drive 100 in accordance with programming and parameter values stored in dynamic random access memory (DRAM) 134 and non-volatile flash memory 136.

Data to be stored by the disc drive 100 are transferred from the host computer 130 to an interface circuit 140, which includes a data buffer for temporarily buffering the data and a sequencer for directing the operation of a read/write channel 142 and a preamp/driver circuit 144 ("preamp") during data transfer operations. The preamp 144 is preferably mounted to the actuator assembly 110, as shown in FIG. 1.

Additionally, as is known in the art a spindle circuit 146 is provided to control the rotation of the disc 106 through back electromotive force (bemf) commutation of the spindle motor 104 (FIG. 1). A servo circuit 148 is provided to control the position of the head 120 relative to the disc 106 as part of a servo loop established by the head 120, the preamp 144, the servo circuit 148 and the coil 113. The servo circuit 148 includes a digital signal processor (DSP) and associated memory (not separately shown), and the control processor communicates with and controls the operation of the DSP in a manner such as generally set forth by U.S. Pat. No. 5,262,907 issued Nov. 16, 1993 to Duffy et al., assigned to the assignee of the present invention.

Figure 3:
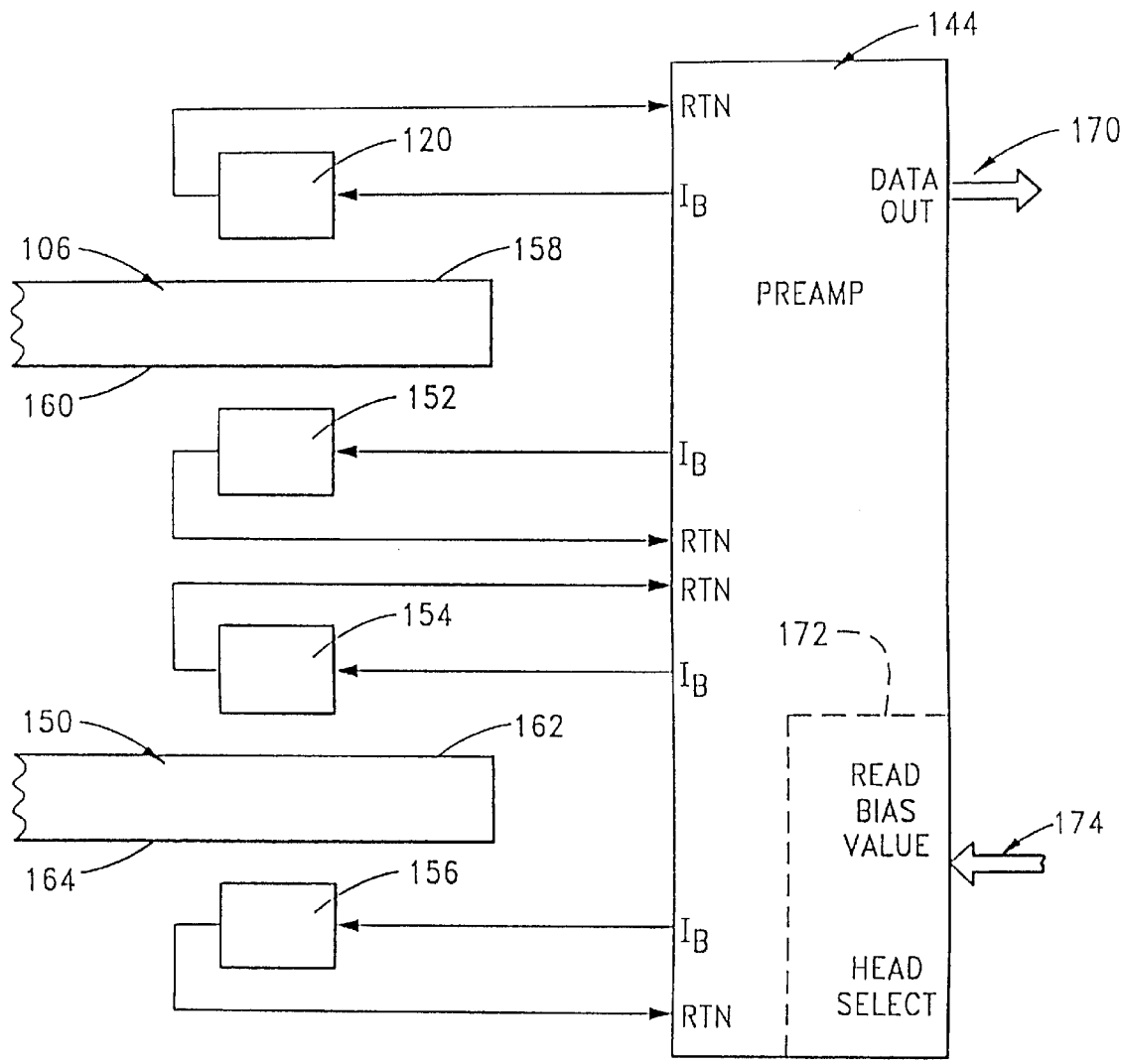
FIG. 3 is a functional block diagram of the preamp shown in FIG. 2, in conjunction with a plurality of heads and discs of the disc drive.

FIG. 3 provides a functional block diagram of the preamp 144 of FIG. 2, in conjunction with the topmost head 120 and disc 106 of FIG. 1. FIG. 3 further shows an additional disc 150 and additional heads 152, 154 and 156; it will be readily understood, however, that although two discs 106, 150 have been shown for purposes of the present discussion, the present invention is not so limited. The heads 120, 132 are supported adjacent recording surfaces 158, 160, of the disc 106, and the heads 154, 156 are supported adjacent recording surfaces 162, 164 of the disc 150.

Figure 4:
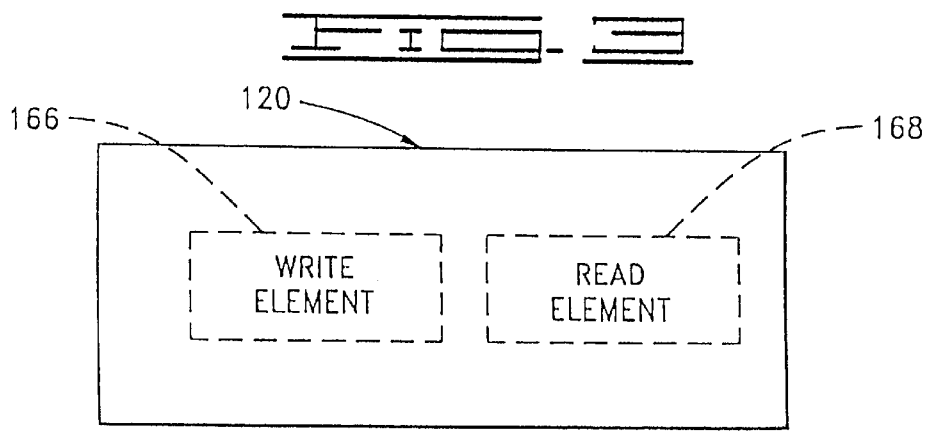
FIG. 4 is a general representation of the head shown in FIG. 2, which is a conventional magneto-resistive (MR) head having a thin-film write element and an MR read element.

The heads 120, 152, 154, 156 are preferably characterized as magneto-resistive (MR) heads, with each head including a conventional thin film write element and MR read element, as generally represented in FIG. 4 at 166, 168 respectively for the head 120. Each MR read element of the disc drive 100 preferably comprises an alloy formed from cobalt, nickel and iron and possesses an electrical resistance that varies when subjected to a magnetic field of a selected orientation. To attain sensitivities necessary to support areal data densities of modern disc drives, each MR read element includes relatively thin boundary layers (typically measured in Angstroms) which are relatively delicate and sensitive to damage. It is thus desirable to hold the common mode potential of all of the MR read elements of each of the heads 120, 152, 154, 156 very closely to that of the discs 106, 150 in order to prevent head-disc electrical discharges (arcing), and to ensure that currents applied to the MR read elements do not exceed the current carrying capabilities of the elements.

Returning again to FIG. 3, as explained more fully below the preamp 144 is used during read and write operations of the disc drive 100 to access data stored on the recording surfaces 158, 160, 162, 164. In doing so, the preamp 144 selectively applies currents to the read and write elements of the heads 120, 152, 154, 156. The preamp 144 preferably incorporates a variety of additional features such as threshold detection, high frequency signal filtering and head selection capabilities as are generally known in the art; for reference, a particularly suitable commercially available preamp is the V10594 from VTC, Inc., of Bloomington, Minn. USA.

Of particular interest to the present discussion is the operation of the preamp 144 during a read operation, during which a read bias current of selected magnitude is continuously applied to the MR read element of the selected head 120, 152, 154, 156. Data stored on the associated recording surface are detected in relation to changes in voltage across the MR read element and reflected in a readback signal output by the preamp 144 to the read/write channel 142 (FIG. 2). In FIG. 3, the readback signal is shown to be transmitted along a DATA OUT path 170, which preferably comprises a pair of signal lines connected to a pair of differential output pins of the preamp 144 (not separately designated).

The magnitudes of the read bias currents (each identified generally as "$I_B$" in FIG. 3) are individually selected for each of the heads 120, 152, 154, 156 during disc drive manufacturing. More particularly, the read bias currents $I_B$ are preferably selected so as to optimize disc drive performance by, for example, writing a selected amount of test data to each of tile recording surfaces 158, 160, 162, 164, reading back the data a number of times using read bias currents $I_B$ of various magnitudes, and selecting the final magnitudes for the read bias currents $I_B$ in relation to those magnitudes that provide the best read error rates (or other evaluation criteria).

The magnitudes of the read bias currents $I_B$ are controlled in response to read bias values that are stored in flash memory 136 and sent by the control processor 132 (FIG. 2) to the preamp 144 by way of the DSP of the servo circuit 148. The read bias values are expressed in a multi-bit, digital form and loaded to a selected address of a register (represented by dotted block 172) of the preamp 144 by way of a serial interface path 174. In similar fashion, the various heads 120, 152, 154, 156 are individually selected in response to a multi-bit, digital head select value which is loaded into another address of the register 172 by way of the serial interface path 174. It will be understood that the serial interface path 174 preferably includes a data line along which the read bias and head select values are transmitted, as well as a clock line for supplying a clock to control the reading and writing of the register 172 and an enable line to enable register access. The preamp 144 is contemplated as accommodating up to 10 different heads and facilitating up to 32 different read bias current levels. Each update of the read bias value or the head select value occurs through the sequential clocking of the bits of a 16 bit word having one read/write command bit, seven address hits and eight data hits. The register 172 is thus updated with a new word upon receipt of the $16^{th}$ clock pulse.

During normal disc drive operation, one of the heads 120, 152, 154, 156 will be in a selected state (referred to herein as a "presently selected head "or "present head"). The preamp 144 will generally operate to continuously apply the appropriate read bias current to the presently selected head. For example, during a write mode of operation during which the presently selected head is used to write data to a selected track on the associated recording surface 158, 160, 162, 164, the data are written through the selective application of write currents by the preamp 144 to the write element (such as 166 of FIG. 4) of the presently selected head. However, the presently selected head also periodically reads data (such as servo or header information) from the associated recording surface during the write operation to enable the servo circuit 148 to control the position of the presently selected head, necessitating the continued application of the read bias current to the MR read element.

Likewise, the preamp 144 continuously applies the read bias current to the presently selected head during each read operation in order to retrieve the data from the associated recording surface. The actual reading and writing of data occurs while the selected track is followed by the presently selected head, although seeks from one track to the next can also be periodically performed, as a number of different tracks (and even from different recording surfaces 158, 160, 162, 164) can be accessed during a particular read or write operation. After the conclusion of each read and write operation, the servo circuit 148 (FIG. 2) generally operates to cause the presently selected head to continue following the last accessed track, until the next command is executed by the disc drive 100.

It will be recognized that the head 120, 152, 154, 156 selected at any given time and the magnitude of the read bias current applied thereto are determined by the head select and read bias values stored in the register 172. Although each of the MR read elements of the heads 120, 152, 154, 156 are nominally identical, process variations among the various heads will cause each head to have its own nominal resistance. Accordingly, if a new, target head has a higher resistance than the presently selected head, a severe overbias condition can occur when the head select value is updated to the target head. Although this overbias condition will only exist for a short time (e.g., until the new read bias value for the target head has been completely entered into the register 172), such condition can stress the target head, leading to degraded performance, or even failure, over time.

Figure 5:
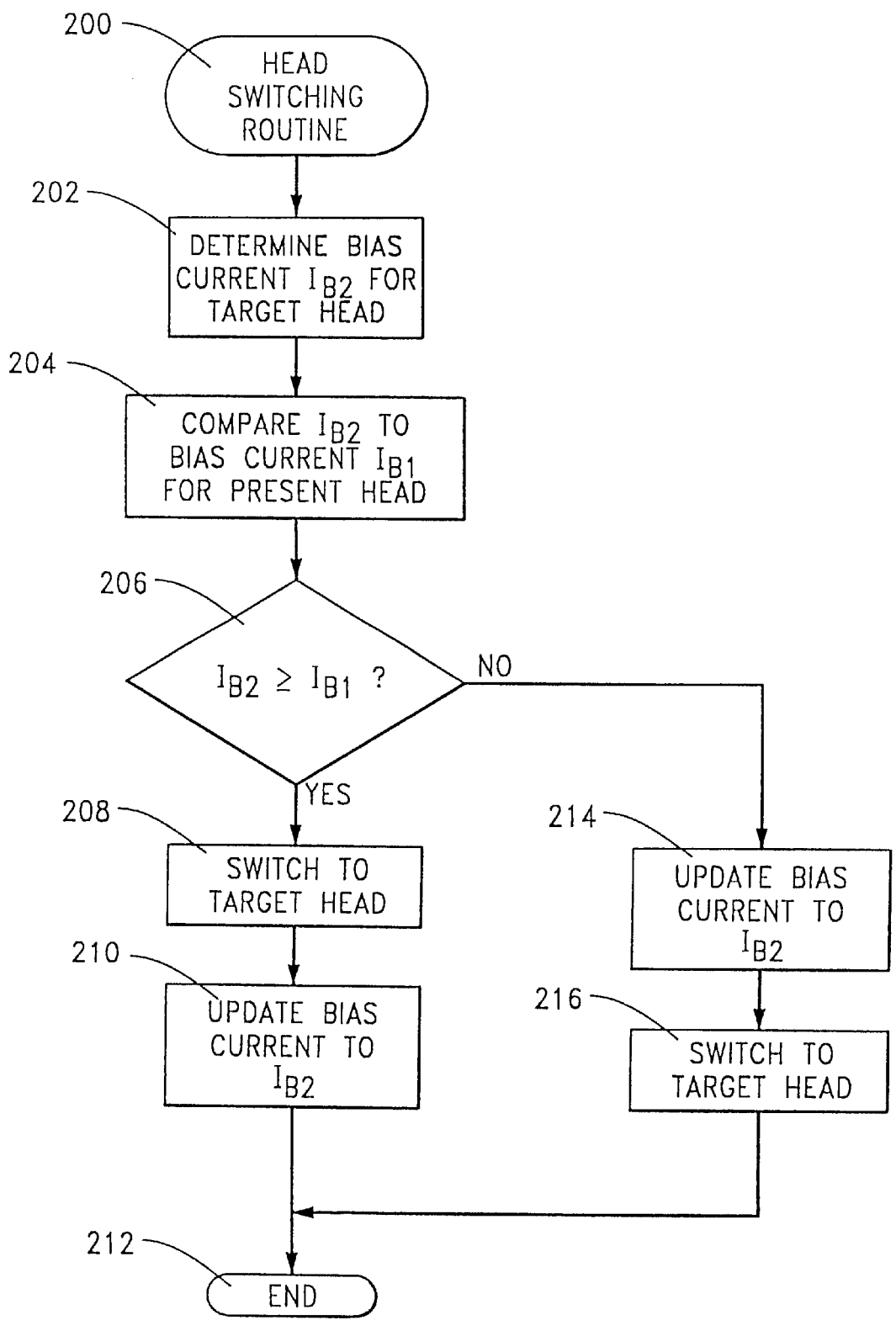
FIG. 5 is a flow chart illustrating the general steps performed in accordance with a HEAD SWITCHING ROUTINE, for which associated programming is stored in the flash memory device of FIG. 2 and utilized by the control processor of FIG. 2 in accordance with a preferred embodiment of the present invention.

As a result, FIG. 5 has been provided which shows a generalized flow chart illustrating a HEAD SWITCHING ROUTINE 200, in accordance with a preferred embodiment of the present invention. The routine is representative of programming stored in the flash memory 136 of FIG. 2 and utilized by the control processor 132 of FIG. 2 at such times that the heads are to be switched. To facilitate the present discussion of the flow of FIG. 5, it will be assumed that the presently selected head is the head 120 and the target head (to which the routine will switch) is the head 152.

As shown at block 202 in FIG. 5, the routine first operates to determine the bias current for the target head 152, which is denoted as $I_{B2}$. This is preferably accomplished by identifying the read bias value for the target head 152 stored as mentioned above in the flash memory 136. It will be understood that this read bias value is preferably expressed as a multi-bit digital value, and does not necessarily directly equal the magnitude of the actual target read bias current in amps; nevertheless, for the purposes of the present discussion and the appended claims, the operation of block 202 can be readily carried out by obtaining the digital read bias value, since this is indicative of the actual target head read bias current (i.e., the magnitude of the analog head bias current is determined in relation to the digitally stored and transmitted head bias value).

Continuing with the flow of FIG. 5, the routine next compares the bias current for the target head 152 to the bias current for the present head 120, which is denoted as $I_{B1}$. This can be readily accomplished by reading the register 172 of the preamp 144 and determining the digital read bias value stored herein; alternatively, the flash memory 136 can be accessed and the read bias value for the present head 120 can be readily retrieved. Again, it is contemplated that obtaining and using the digital read bias value for the present falls within the operation set forth by block 204.

As shown by decision block 206, at such time that $I_{B2}$ is greater or equal to $I_{B1}$ (that is, the target head bias current is greater than the present head bias current), the flow passes to block 208 where the control processor 132 updates the head select value in the register 172 of the preamp 144, so that the disc drive 100 switches heads from 120 to 152. Once the head switch value has been updated, as shown by block 210, the control processor 132 next causes the read bias value in the register 172 to be updated, so that the target head bias current $I_{B2}$ is properly applied to the target head 152, after which the routine ends at 212.

Because the bias current for head 152 is greater or equal to the bias current for the head 120, there is little danger of generating an overbias condition on the head 152 by the application of the bias current $I_{B1}$ thereto, so it is safe to first switch the heads and then update the read bias current in this situation.

However, when the target head read bias current is less than the present head read bias current, the flow of FIG. 5 passes from decision block 206 to block 214 where the read bias current is first updated to the target head value, after which the head is switched to the target head 152 at block 216 (and the routine ends at 212). As will be recognized, in this case it is safer to first switch the read bias current before switching the heads.

It will now be realized that an important advantage of the routine of FIG. 5 is that inadvertent stresses to the MR read elements are avoided by ordering the changes in read bias current and selected head so that no MR read element receives an excessive read bias current. As discussed above, always switching the heads first, in accordance with usual practices of the prior art, provides an attendant risk that some heads will be temporarily subjected to a higher than desired bias current. Alternatively, switching the bias current every time before switching heads does not improve this situation, as this merely results in the potential application of an undesirably high bias current to the presently selected head just before the target head is selected.

In summary, it will now be recognized that the present invention is directed to an apparatus and method for minimizing damage to a disc drive (such as 100) during head switching operations. The disc drive comprises a plurality of magnetic recording surfaces (such as 158, 160, 162, 164) to and from which data are transferred using read/write heads (such as 120, 152, 154, 156), each head utilizing the application of a bias current during operation. Preferably, the heads are characterized as magneto-resistive heads, each having a magneto-resistive read element (such as 168).

To switch from a presently selected head (such as 120) to a target head (such as 152), the disc drive determines a first value indicative of the magnitude of a bias current for the presently selected head and a target bias current to be applied to the target head (Such as at 202, 204). When the second value is greater than the first value, the disc drive switches from the presently selected head to the target head and then applies the target bias current (such as at 208, 210); conversely, when the first value is greater than the second value, the target bias current is applied to the presently selected head and then the disc drive switches from the presently selected head to the target head (such as at 214, 216).

The disc drive preferably comprises a preamplifier circuit (such as 144) which is operably coupled to the heads and applies the bias currents to the heads in response to a read bias value provided by a head selection control circuit (such as the control processor 132). The head selection control circuit further preferably causes the preamplifier circuit to individually select the heads in response to a head select value. The head bias and head select values are preferably expressed digitally and are provided to a register (such as 172) of the preamplifer by way of an input path (such as 174).

For purposes of the following claims, it will be understood that the term "bias current "comprises a current that is applied to a head to facilitate the operation of the bead, such as the read bias current discussed hereinabove with respect to magneto-resistive heads. However, other types of heads utilizing bias currents, such as giant magneto-resistive (GMR), spin valve heads, and the like are also contemplated as being readily within the spirit and scope of the claimed invention. Further, the use of the term "circuit "will be readily understood to cover both hardware and firmware implementations, such as with a programmable processor (i.e., the control processor 132) disclosed herein. Finally, it will be understood that although certain method claims show an ordering of steps, the scope of the claims are not necessarily limited to the ordering of the steps presented therein.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A disc drive, comprising:

first and second heads adjacent respective first and second magnetic recording surfaces, the first head using a first current magnitude to transducer data from the first magnetic recording surface and the second head using a second current magnitude to transducer data from the second magnetic recording surface; and head switching means for switching from the first head to the second head by comparing the first current magnitude to the second current magnitude and switching from the first head to the second head and then switching from the first current magnitude to the second current magnitude when the second current magnitude is greater than the first current magnitude, and switching from the first current magnitude to the second current magnitude and then switching from the first head to the second head when the first current magnitude is greater than the second current magnitude.

2. A disc drive, comprising:

first and second heads adjacent respective first and second magnetic recording surfaces, the first head using a first current magnitude to transducer data from the first magnetic recording surface and the second head using a second current magnitude to transducer data from the second magnetic recording surface; and an electrical circuit, connected to the first and second heads, which switches from the first head to the second head by comparing the first current magnitude to the second current magnitude and switching from the first head to the second head and then switching from the first current magnitude to the second current magnitude when the second current magnitude is greater than the first current magnitude, and switching from the first current magnitude to the second current magnitude and then switching from the first head to the second head when the first current magnitude is greater than the second current magnitude.

3. The disc drive of claim 2, wherein the electrical circuit comprises a bias current source which selectively generates the first and second current magnitudes, a comparator circuit which compares the first and second current magnitudes, and a head switch circuit, coupled to the bias current source and the comparator circuit, which selectively interconnects the bias current source to the first and second heads.

* * * * *